United States Patent [19]

Byker

[11] Patent Number: 5,280,380

[45] Date of Patent: Jan. 18, 1994

[54] UV-STABILIZED COMPOSITIONS AND METHODS

[75] Inventor: Harlan J. Byker, Zeeland, Mich.

[73] Assignee: Gentex Corporation, Zeeland, Mich.

[21] Appl. No.: 939,849

[22] Filed: Sep. 2, 1992

Related U.S. Application Data

[63] Continuation of Ser. No. 515,511, Apr. 30, 1990, abandoned.

[51] Int. Cl.$^5$ .............................................. G02F 1/01
[52] U.S. Cl. .................................... 359/265; 359/839; 252/600
[58] Field of Search ............... 252/622, 600; 359/265, 359/270, 839, 275

[56] References Cited

U.S. PATENT DOCUMENTS

| | | | |
|---|---|---|---|
| 4,376,569 | 3/1983 | Barltrop et al. | 350/357 |
| 4,477,521 | 10/1984 | Lehmann et al. | 428/336 |
| 4,524,165 | 6/1985 | Musser et al. | 525/437 |
| 4,525,504 | 6/1985 | Morris et al. | 525/437 |
| 4,749,749 | 6/1988 | Munzer et al. | 525/148 |
| 4,807,977 | 2/1989 | Sammells | 350/357 |
| 4,902,108 | 2/1990 | Byker | 350/601 |
| 5,073,012 | 12/1991 | Lynam | 359/265 |
| 5,140,455 | 8/1992 | Varaprasad et al. | 359/275 |
| 5,142,407 | 8/1992 | Varaprasad et al. | 359/276 |
| 5,151,816 | 9/1992 | Varaprasad et al. | 359/275 |

FOREIGN PATENT DOCUMENTS 0430684 6/1991 European Pat. Off. .
0435689 7/1991 European Pat. Off. .

OTHER PUBLICATIONS

Cipriani and Hosler, "Ultraviolet Absorbers," Modern Plastics Encyclopedia, vol. 45, No. 1A, Sep., 1967, pp. 406–409.

Primary Examiner—Donald Hajec
Assistant Examiner—Tan Ho
Attorney, Agent, or Firm—Foley & Lardner

[57] ABSTRACT

The present invention concerns compositions, which comprise a solvent, which is suitable for a medium of variable transmittance in a solution-phase electrochromic device, and a UV-stabilizer, which is an ester of 2-cyano-3,3-diphenyl acrylic acid. Among embodiments of the invention are solutions used as media of variable transmittance in electrochromic devices, especially single-compartment, self-erasing, solution-phase electrochromic devices. The UV-stabilizer provides to the compositions of the invention stability against degradation from exposure to ultraviolet radiation, including that from the sun. Among applications of electrochromic devices comprising solutions according to the invention are use as variable transmittance components in variable reflectance, outside, rearview mirrors for automobiles.

29 Claims, 1 Drawing Sheet

UV-STABILIZED COMPOSITIONS AND METHODS

This is a continuation of application Ser. No. 515,511 filed Apr. 30, 1990, now abandoned.

TECHNICAL FIELD

The present invention relates to compositions, which are stabilized against degradation during exposure to ultraviolet light, and methods of making and using such compositions.

More particularly, the invention concerns such compositions, which are solutions used as media of variable transmittance in self-erasing, solution-phase electrochromic devices.

BACKGROUND OF THE INVENTION

A major problem which limits the usefulness and useful lifetime of materials exposed to ultraviolet (UV) radiation is degradation associated with such exposure. This degradation results from decomposition and other chemical reactions of organic compounds in the materials initiated by absorption by such compounds of photons of ultraviolet light. Materials exposed to sunlight are especially susceptible to degradation due to UV-exposure, because a significant component of sunlight is UV-radiation. Among such materials are paints, plastics, fabrics and dyes.

In U.S. Pat. No. 4,902,108, which is incorporated herein by reference, solutions of electrochromic compounds are described. These solutions are useful as the media of variable transmittance in single-compartment, self-erasing, solution-phase electrochromic devices. The devices, in turn, are useful as the variable transmittance components in variable transmission light filters, such as windows, and variable reflectance mirrors, such as anti-glare rearview mirrors in automobiles. Components of the solutions of electrochromic compounds described in the aforementioned patent, especially the electrochromic compounds themselves, readily absorb UV photons and, as a consequence, undergo degradative reactions upon exposure to UV light. Thus, windows and rearview mirrors, wherein such solutions are employed to provide variable transmittance or reflectance, have useful lifetimes significantly limited in environments, such as on the outside walls of buildings or on the outside of automobiles, where they are exposed for extended periods of time to ultraviolet light, as from the sun.

There has existed a need, then, to stabilize materials, which comprise UV-radiation-absorbing organic compounds, against degradation caused by exposure to UV-light. Many ultraviolet stabilizer agents, which are compounds which provide such stabilization, when combined with compounds susceptible to UV-degradation, are known in the art. Ultraviolet stabilizer agents absorb ultraviolet radiation competitively with other compounds in a stabilized composition or are capable, without decomposition of the stabilizer itself, of dissipating the energy acquired upon absorption of a UV-photon by the materials being stabilized. Such agents must also satisfy a number of other requirements, depending on properties of the compositions to be stabilized. For example, the agents must be sufficiently soluble in such a composition and must not interact with other components in the composition in a way that interferes with using the composition for its intended purpose. Thus, an ultraviolet stabilizer agent for use in a plastic must not, at a concentration high enough to provide the desired stability, adversely affect, for example, the strength of the plastic. Similarly, an ultraviolet stabilizer agent for use in a solution of electrochromic compounds employed as a medium of variable transmittance to visible light in an electrochromic device must not interact with the electrochromic compounds in a way that so significantly reduces their changes in absorbance to visible light upon oxidation or reduction that they cease to function effectively as electrochromic compounds and must not compete with the electrochromic compounds for oxidation or reduction at the electrodes of an electrochromic device.

Among ultraviolet stabilizer agents, known to stabilize plastics, are the compound ethyl-2-cyano-3,3-diphenyl acrylate, sold by BASF (Parsippany, N.J., USA) under the trademark Uvinul N-35 and by Aceto Corporation (Flushing, N.Y., USA) under the trademark Viosorb 910; the compound (2-ethylhexyl)-2-cyano-3,3-diphenyl acrylate, sold by BASF under the trademark Uvinul N-539; the compound 2-(2-hydroxy-4-methylphenyl)benzo[d]triazole, sold by Ciba-Geigy Corp. under the trademark Tinuvin P; the compound 2-hydroxy-4-methoxybenzophenone, sold by American Cyanamid under the trademark Cyasorb UV 9; and the compound 2-ethyl-2'-ethoxyoxalanilide, sold by Sandoz Color & Chemicals under the trademark Sanduvor VSU.

The present invention is directed to stabilization against degradation upon exposure to UV-radiation of solutions, such as those described in U.S. Pat. No. 4,902,108, which are useful as the media of variable transmittance in electrochromic devices, especially single-compartment, self-erasing, solution-phase electrochromic devices.

SUMMARY OF THE INVENTION

It has now been discovered surprisingly that esters of 2-cyano-3,3-diphenyl acrylic acid are highly effective as ultraviolet stabilizer agents for solutions which comprise electrochromic compounds and are useful as media of variable transmittance in electrochromic devices, including such solutions described in U.S. Pat. No. 4,902,108.

A solution of the invention, which comprises electrochromic compounds and is useful as a medium of variable transmittance in electrochromic devices, is prepared simply by combining an electrochromic compound with another solution of the invention, which comprises an ester of 2-cyano-3,3-diphenyl acrylic acid and a solvent, which is suitable for a medium of variable transmittance in an electrochromic device.

Further, surprisingly, it has been found that esters of 2-cyano-3,3-diphenyl-acrylic acid are much more effective in stabilizing solutions, which comprise electrochromic compounds and are useful as media of variable transmittance in electrochromic devices, against degradation due to exposure to UV-radiation than compounds such as 2-(2-hydroxyphenyl)benzotriazoles (e.g., Tinuvin P); 2-hydroxybenzophenones (e.g., Cyasorb UV 9), oxalanilides (e.g., Sanduvor VSU) and other classes of stabilizers taught in the prior art to stabilize plastics against exposure to UV-radiation.

The invention substantially eliminates the problem of susceptibility to degradation upon exposure to UV-radiation, and particularly such radiation from sunlight, of solutions of electrochromic compounds employed as media of variable transmittance in electrochromic devices, such as those taught in U.S. Pat. No. 4,902,108. Thus, among other advantages, the invention makes commercially feasible, for the outside of automobiles, variable reflectance rearview mirrors wherein the variable transmittance component is such an electrochromic device.

DETAILED DESCRIPTION OF THE INVENTION

Figure 1:
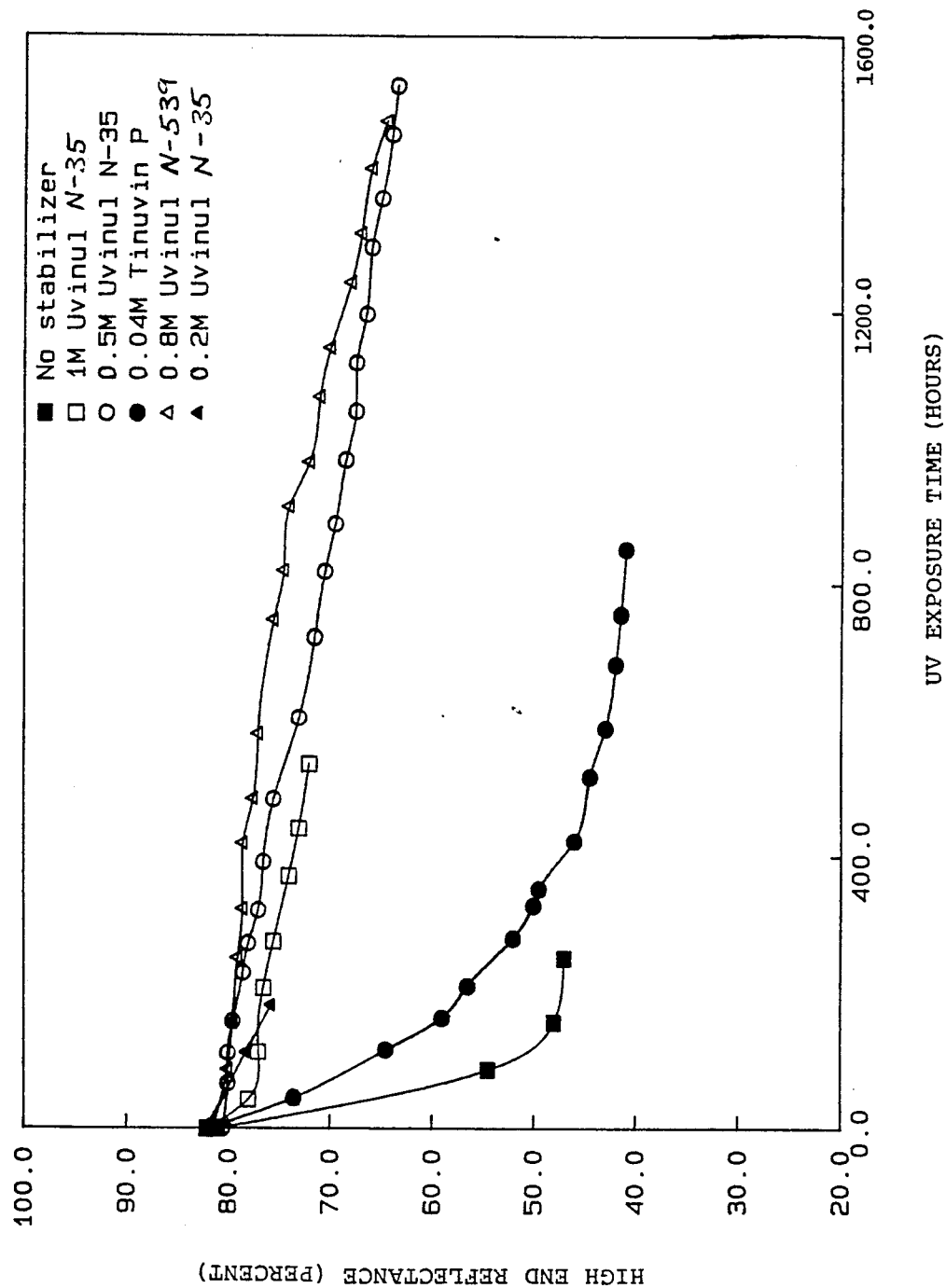
FIG. 1 illustrates the results of experiments, in which stability against degradation due to exposure to UV-radiation was measured for various solutions, which comprised various UV-stabilizer agents and were used as media of variable transmittance in single-compartment, self-erasing, solution-phase electrochromic devices used as the variable transmittance components in variable reflectance mirrors.

The present invention provides a solution which comprises (a) a non-aqueous solvent, which is suitable for a medium of variable transmittance in a solution-phase electrochromic device, and (b) a compound of Formula I

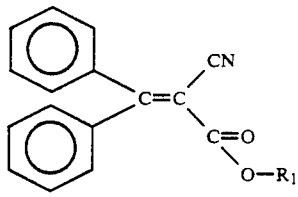

I wherein $R_1$ is alkyl of 1 to 20 carbon atoms.

Among the non-aqueous solvents suitable for such a solution of the invention are any of those, other than water, known in the art of solution-phase electrochromic devices to be suitable for the dissolution of one or both of an anodic electrochromic compound and a cathodic electrochromic compound in order to provide a solution which is the medium of variable transmittance (to visible light) of an electrochromic device. Such solvents include, among others, N,N-dimethylformamide, dimethyl sulfoxide, acetonitrile and cyclic esters. Suitable cyclic ester solvents include propylene carbonate, gamma-butyrolactone, gamma-valerolactone, and any homogeneous mixture that is liquid at room temperature of any two or more of said cyclic ester solvents or any one or more of said cyclic ester solvents with ethylene carbonate. Most preferred is neat propylene carbonate.

The compounds of Formula I, esters of 2-cyano-3,3-diphenyl acrylic acid, are known. The alkyl group, $R_1$, of the compound of Formula I can be linear or branched, cyclic or alkyl-substituted cyclic. Preferred for $R_1$ are ethyl and 2-ethylhexyl; most preferred is ethyl.

Solutions of the invention also include solutions which are media of variable transmittance in solution-phase electrochromic devices and which, as such, comprise one or both of an anodic electrochromic compound and a cathodic electrochromic compound and may comprise other components as well, as understood in the solution-phase electrochromic device art. An anodic electrochromic compound is one which, upon an electrochemical oxidation, increases its absorbance at at least one wavelength in the visible spectrum. Similarly, a cathodic electrochromic compound is one which, upon an electrochemical reduction, increases its absorbance at at least one wavelength in the visible range. The preferred solutions of the invention are those which are media of reversibly variable transmittance in single-compartment, solution-phase, self-erasing electrochromic devices, as described in U.S. Pat. No. 4,902,108. In the more preferred of these solutions, both the anodic and the cathodic electrochromic compounds in the solvent of the solution will display at least two chemically reversible oxidation (in the case of the anodic) or reduction (in the case of the cathodic) waves in a voltammogram done at room temperature. The most preferred anodic compound is 5,10-dihydro-5,10-dimethylphenazine. The most preferred cathodic compound is the difluoroborate salt of benzyl viologen (1,1'-dibenzyl-4,4'-bipyridinium difluoroborate).

Solutions of the invention, which are media of reversibly variable transmittance in solution-phase electrochromic devices, may also comprise an inert, current carrying electrolyte, particularly if the solution does not include an electrochromic compound which is ionic in its equilibrium state in an electrochromic device with no potential difference between the cathode and anode. Such inert, current-carrying electrolytes are well known in the art. Examples are provided in U.S. Pat. No. 4,902,108.

Solutions of the invention, which are media of reversibly variable transmittance in solution-phase electrochromic devices, may also include a polymeric thickener. In this regard, reference is also made to U.S. Pat. No. 4,902,108. While many such thickeners are known, "PEOX" (polyethylene oxide) and "PMMA" (polymethylmethacrylate) are preferred. Most preferred is PMMA. The concentration of thickener, relative to solvent, is typically about 1% (w/w) to about 25% (w/w). With PEOX and PMMA, the most preferred concentration range is about 2% to about 5%.

In the more preferred solutions according to the invention, $R_1$ in the compound of Formula I will be ethyl or 2-ethylhexyl and the compound of Formula I will be present at room temperature at between about 25 mM to about 1300 mM, more preferably about 50 mM to about 500 mM, in propylene carbonate as solvent. Further, in these more preferred solutions, PMMA thickener at between about 2% (w/w) and about 5% (w/w)(relative to the weight of solvent), 5,10-dihydro-5,10-dimethylphenazine at between about 10 mM and about 100 mM (more preferably between about 25 mM and about 50 mM)(in the solvent at room temperature), and 1,1'-dibenzyl-4,4'-bipyridinium difluoroborate at between about 10 mM and about 100 mM (more preferably between about 25 mM and about 50 mM)(in the solvent at room temperature), will also be present.

Solution-phase electrochromic devices, which comprise as the medium of reversibly variable transmittance a solution according to the invention, are also encompassed by the present invention. Preferred among these are single-compartment, self-erasing devices.

Thus, in another of its embodiments, the invention entails, in a single-compartment, self-erasing, solution-phase electrochromic device, which comprises as the medium of reversibly variable transmittance to light a solution which comprises a non-aqueous solvent, at least one cathodic compound, at least one anodic compound, and, if all of the cathodic and anodic compounds in their zero-potential equilibrium states in the solution are not ionic, an inert, current-carrying electrolyte, the improvement which comprises the presence in said solution of a compound of Formula I.

The devices of the invention can be employed as the variable transmittance components of variable transmission light filters, such as windows, or variable reflectance mirrors, including anti-glare, outside and inside, rearview mirrors in automobiles.

Preparation of a solution of the invention is straightforward. First, a solution of a dry, non-aqueous solvent, which is suitable for a medium of variable transmittance in a solution-phase electrochromic device and a compound of Formula I at the desired concentration is prepared, typically by simply combining the solvent and compound of Formula I and stirring at room temperature until dissolution is complete. The resulting solution of the invention may then be combined with thickener, if thickener is to be present in the final solution. Typically, the solution of compound of Formula I in solvent is simply combined with the amount of polymeric thickener (e.g., in the case of PMMA, in the form of commercially available beads, or, in the case of PEOX, in the form of commercially available powder) required to reach the desired concentration of thickener in the solution and the resulting mixture is stirred at between about room temperature and about 70° C. (e.g., 60° C. with PMMA in propylene carbonate) until dissolution of the thickener is achieved. Then, after the resulting solution is cooled to room temperature, electrochromic compounds and, if used, inert current-carrying electrolyte are added to prepare the solution of the invention, which is a medium of variable transmittance. In one preferred procedure, employed with 5,10-dihydro-5,10-dimethyl-phenazine and 1,1'-dibenzyl-4,4'-bipyridinium difluoroborate as the electrochromic compounds, the anodic compound is dissolved at room temperature to twice the desired final concentration in a first aliquot of the (optionally thickened) solution and the cathodic compound is dissolved at room temperature to twice the desired concentration in a second aliquot of the (optionally thickened) solution. If inert current-carrying electrolyte is employed, it is included, at twice the desired final concentration, in the aliquot with the cathodic compound. (The sensitivity of 5,10-dihydro-5,10-dimethylphenazine to oxygen in the air appears to be greater in the presence of benzyl viologen or other ionic substance, such as current-carrier electrolyte, than in their absence; thus, to minimize this sensitivity, the two solutions are prepared separately and combined just prior to filling the device). Finally, just prior to use in filling the electrochromic device, the solution which is the medium of variable transmittance is finally prepared by simply combining equal volumes of the solution with the anodic compound and the solution with the cathodic compound.

Construction of single-compartment, self-erasing, solution-phase electrochromic devices according to the invention are described in U.S. Pat. No. 4,902,108.

"Room temperature" means 20° C.–27° C., typically 23° C.–25° C.

The stability of a solution against degradation due to exposure to UV-radiation is typically measured by monitoring the change in absorbance of the solution (or, alternatively, the reflectance of a mirror for which the solution is the medium of variable transmittance) in its zero-potential equilibrium state or its fully darkened state as a function of time during exposure to light from a mercury or xenon arc lamp at an elevated temperature in a controlled environment. Measurement of stability is described in somewhat more detail in the examples.

The invention will now be illustrated in more detail in the following examples.

EXAMPLE I

Solutions were prepared by dissolving in dry, neat propylene carbonate at room temperature, various UV stabilizers, including no stabilizer, Tinuvin P to 0.04M (which was found to be near its solubility in the solvent at room temperature), Uvinul N-35 (or Viosorb 910) to 0.2M, 0.5M, and 1M (1.3M was found to be near the solubility of ethyl 2-cyano-3,3-diphenyl acrylate in the solvent at room temperature), Tinuvin P to 0.04M together with Uvinul N-35 (or Viosorb 910) to 0.5M, and Uvinul N-539 to 0.8M. In each case, a thickened solution was next prepared by combining with an aliquot of the solution 3% (w/w) PMMA beads and stirring at 60° C. until the PMMA dissolved completely. The thickened solution was then cooled to room temperature and divided into two parts. Benzyl viologen (difluoroborate) was dissolved to 64 mM in one part, and dimethylphenazine (i.e., 5,10-dihydro-5,10-dimethyl-phenazine) was dissolved to 64 mM in the other part. Finally, equal volumes of the two parts were mixed and the resulting solution used to fill a single-compartment, self-erasing, solution-phase electrochromic device, which served as the variable transmittance component of a variable reflectance mirror.

The stability of the solutions in the electrochromic devices against degradation due to exposure to UV-radiation was determined by measuring the reflectance of the mirrors, with the electrochromic devices in their zero-potential equilibrium states (i.e. "high end reflectance"), as a function of exposure time to light from a mercury arc lamp. The temperature of the mirrors was held at 70°±5° C. and the UV intensity in the range of 320 nm to 385 nm was 3.0±0.5 mW/cm$^2$.

The results of the experiments with no stabilizer, Tinuvin P at 0.04M, Uvinul N-35 (or Viosorb 910) at 0.2M, 0.5M, and 1M, and Uvinul N-539 at 0.8M are shown in FIG. 1.

Use of 0.04M Tinuvin P in combination with 0.5M Uvinul N-35 (or Viosorb 910) provided no significant improvement over 0.5M Uvinul N-35 (or Viosorb 910) by itself.

Stabilization by ethyl 2-cyano-3,3-diphenyl acrylate was tested with gamma-butyrolactone. Results similar to those seen in propylene carbonate were obtained.

Ethyl 2-cyano-3,3-diphenyl acrylate was found to not affect the cycle life of the electrochromic devices.

EXAMPLE II

Nine electrochromic devices (electrochromic mirror elements)(variable transmittance components of variable reflectance mirrors) for outside mirrors of automobiles were filled with a solution, in which propylene carbonate was the solvent and which comprised 3% (w/w) PMMA, 500 mM ethyl-2-cyano-3,3-diphenyl acrylate, 25 mM of 5,10-dihydro-5,10-dimethylphenazine, and 25 mM benzylviologen (difluoroborate salt). For white light, the average high end reflectance (i.e., at equilibrium with no potential difference between the electrodes) of the mirrors was 83.8% and the average low end reflectance (electrochromic solution as dark as possible) was 9.9%. After exposure to 1875 hours of xenon arc uv irradiation, according to the Society of Automotive Engineers J 1960 accelerated exposure test procedure the average high end reflectance was 71.8% and the average low end reflectance was 11.2%. This test is often accepted in the art to represent 10 years of outdoor solar UV exposure. The very slow rate of degradation of the electrochromic mirror reflectance in this test is well within acceptable limits for commercial application.

I claim:

1. A solution which comprises (a) a non-aqueous solvent, which is suitable for a medium of variable transmittance in a solution-phase electrochromic device, and (b) a compound of Formula I

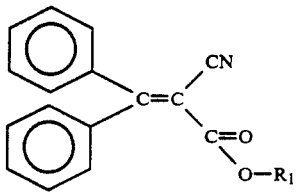

I wherein $R_1$ is alkyl of 1 to 20 carbon atoms.

2. A solution according to claim 1 wherein the solvent is a liquid at room temperature and is selected from the group consisting of propylene carbonate, gamma-butyrolactone, gamma-valerolactone, and any homogeneous mixture that is liquid at room temperature of any two or more of said solvents or any one or more of said solvents with ethylene carbonate.

3. A solution according to claim 2 which comprises additionally an anodic and a cathodic electrochromic compound.

4. A solution according to claim 3 which comprises 5,10-dihydro-5,10-dimethylphenazine and 1,1'-dibenzyl-4,4'-bipyridinium difluoroborate.

5. A solution according to claim 2 wherein, in the compound of Formula I, $R_1$ is selected from the group consisting of ethyl and 2-ethylhexyl.

6. A solution according to claim 5 which comprises additionally an anodic and a cathodic electrochromic compound.

7. A solution according to claim 6 which comprises 5,10-dihydro-5,10-dimethylphenazine and 1,1'-dibenzyl-4,4'-bipyridinium difluoroborate.

8. A solution according to claim 5 wherein the solvent is propylene carbonate.

9. A solution according to claim 8 which comprises additionally an anodic and a cathodic electrochromic compound.

10. A solution according to claim 9 which comprises 5,10-dihydro-5,10-dimethylphenazine and 1,1'-dibenzyl-4,4'-bipyridinium difluoroborate.

11. A solution according to claim 10 wherein the concentration at room temperature in the propylene carbonate of the compound of Formula I is between about 25 mM and about 1300 mM, the concentration at room temperature in the propylene carbonate of the 5,10-dihydro-5,10-dimethylphenazine is between about 10 mM and about 100 mM, and the concentration at room temperature in the propylene carbonate of the 1,1'-dibenzyl-4,4'-bipyridinium difluoroborate is between about 10 mM and about 100 mM.

12. A solution according to claim 11 wherein the concentration at room temperature in the propylene carbonate of the compound of Formula I is between about 50 mM and about 500 mM, the concentration at room temperature in the propylene carbonate of the 5,10-dihydro-5,10-dimethylphenazine is between about 20 mM and about 50 mM, and the concentration at room temperature in the propylene carbonate of the 1,1'-dibenzyl-4,4'-bipyridinium difluoroborate is between about 20 mM and about 50 mM.

13. A solution according to claim 5 wherein, in the compound of Formula I, $R_1$ is ethyl.

14. A solution according to claim 13 which comprises additionally an anodic and a cathodic electrochromic compound.

15. A solution according to claim 14 which comprises 5,10-dihydro-5,10-dimethylphenazine and 1,1'-dibenzyl-4,4'-bipyridinium difluoroborate.

16. A solution according to claim 13 wherein the solvent is propylene carbonate.

17. A solution according to claim 16 which comprises additionally an anodic and a cathodic electrochromic compound.

18. A solution according to claim 17 which comprises 5,10-dihydro-5,10-dimethylphenazine and 1,1'-dibenzyl-4,4'-bipyridinium difluoroborate.

19. A solution according to claim 18 wherein the concentration at room temperature in the propylene carbonate of the compound of Formula I is between about 25 mM and about 1300 mM, the concentration at room temperature in the propylene carbonate of the 5,10-dihydro-5,10-dimethylphenazine is between about 10 mM and about 100 mM, and the concentration at room temperature in the propylene carbonate of the 1,1'-dibenzyl-4,4'-bipyridinium difluoroborate is between about 10 mM and about 100 mM.

20. A solution according to claim 19 wherein the concentration at room temperature in the propylene carbonate of the compound of Formula I is between about 50 mM and about 500 mM, the concentration at room temperature in the propylene carbonate of the 5,10-dihydro-5,10-dimethylphenazine is between about 20 mM and about 50 mM, and the concentration at room temperature in the propylene carbonate of the 1,1'-dibenzyl-4,4'-bipyridinium difluoroborate is between about 20 mM and about 50 mM.

21. A solution according to any of claims 1 to 20 which is thickened with 1% (w/w) to 25% (w/w) of a thickener selected from the group consisting of PEOX and PMMA.

22. A solution according to claim 21 wherein the thickener is PMMA at a concentration at room temperature between about 2% (w/w) and about 5% (w/w).

23. A solution according to claim 1 which comprises additionally an anodic and a cathodic electrochromic compound.

24. A solution according to claim 23 which comprises 5,10-dihydro-5,10-dimethylphenazine and 1,1'-dibenzyl-4,4'-bipyridinium difluoroborate.

25. In a single-compartment, self-erasing, solution-phase electrochromic device, which comprises as the medium of reversibly variable transmittance to light a solution which comprises a non-aqueous solvent, at least one cathodic compound, at least one anodic compound, and, if all of the cathodic and anodic compounds in their zero-potential equilibrium states in the solution are not ionic, an inert, current-carrying electrolyte, the improvement which comprises the presence in said solution of a compound of Formula I

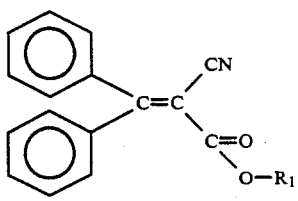

wherein $R_1$ is alkyl of 1 to 20 carbon atoms.

26. The improvement according to claim 25 wherein the solution further comprises a polymeric thickener.

27. The improvement according to claim 26 wherein, in the compound of Formula I, $R_1$ is selected from the group consisting of ethyl and 2-ethylhexyl.

28. The improvement according to claim 26 or 27 wherein the solvent is propylene carbonate, the only cathodic electrochromic compound is 1,1'-dibenzyl-4,4'-bipyridinium difluoroborate, the only anodic electrochromic compound is 5,10-dihydro-5,10-dimethylphenazine, and the thickener is selected from the group consisting of PEOX and PMMA.

29. The improvement according to claim 28 wherein, in the compound of Formula I, $R_1$ is ethyl and the thickener is PMMA.

* * * * *